United States Patent [19]

Mahan

[11] Patent Number: 4,827,874

[45] Date of Patent: May 9, 1989

[54] ELECTRIFIED PET DISH

[76] Inventor: Richard E. Mahan, 14030 Brownwood St., Houston, Tex. 77015

[21] Appl. No.: 131,570

[22] Filed: Dec. 11, 1987

[51] Int. Cl.⁴ .............................................. A01K 5/00
[52] U.S. Cl. ...................................................... 119/61
[58] Field of Search ............................ 119/61; 43/112

[56] References Cited

U.S. PATENT DOCUMENTS

| | | | |
|---|---|---|---|
| 2,259,682 | 10/1941 | Collins | 119/61 |
| 2,588,894 | 3/1952 | Taff | 43/112 |
| 2,647,228 | 7/1953 | Just | 43/112 |
| 3,112,731 | 12/1963 | Lako et al. | 119/61 |
| 3,504,892 | 4/1970 | Crist | 43/112 |
| 4,074,456 | 2/1978 | Tidwell | 43/112 X |
| 4,144,668 | 3/1979 | Darncharnjitt | 43/112 X |
| 4,165,577 | 8/1979 | Shanahan et al. | 43/112 |
| 4,471,561 | 9/1984 | Lapierre | 43/112 X |

*Primary Examiner*—Robert P. Swiatek
*Assistant Examiner*—R. Thomas Price
*Attorney, Agent, or Firm*—Neal J. Mosely

[57] ABSTRACT

An electrified pet feeding dish for preventing crawling insects from gaining access to the pet's food or water comprises a dish formed of electrically insulated material which has at least one pair of parallel electrically conductive strips secured to the side wall of the dish to completely encircle the dish and which are connected to a low voltage DC battery also secured to the dish. The strips of electrical conductive material are spaced apart sufficient to normally prevent completion of a circuit across the strips and for completion of a circuit across said strips through an insect's body as the insect attempts to traverse the strips when crawling up the side wall. The current passing through the insects body is sufficient to produce a sensation which will discourage further travel up the side wall. A pet or human who may come into contact with the strips will usually not feel the current, and even if the pet or human is wet, the current will produce only a slight tingling sensation. The electrical apparatus may also be provided in kit form to be installed on conventional dishes by the consumer.

20 Claims, 2 Drawing Sheets

U.S. Patent  May 9, 1989  Sheet 1 of 2  4,827,874

ELECTRIFIED PET DISH

BACKGROUND OF THE INVENTION

1. Field of the Invention

This invention relates generally to electrical insect eradication devices, and more particularly to an electrified pet dish having insect repelling strips.

2. Brief Description of the Prior Art

Devices for the eradication of crawling insects through the use of electricity are known in the art. There are several patents which disclose various devices for the electrical eradication of insects.

Lapierre, U.S. Pat. No. 4,471,561 discloses a base sheet of electrical insulating material which will encircle a structure to be protected. Electrical contacts are embedded in the insulating base sheet except for limited exposed areas on the side of the sheet facing away from the structure. Power is supplied by a low voltage DC battery and converted to pulsating high voltage current at the electrodes by a transformer circuit.

Shanahan et al, U.S. Pat. No. 4,165,577 discloses an electric baseboard trap for crawling insects. An elongated L-shaped base is mounted at the juncture of the wall and floor and has a well at the bottom. Electrical conductor strips are spaced apart on opposite sides of the well so that after an insect touches both conductors it will fall into the well.

Makara, U.S. Pat. No. 3,077,050 discloses a combined ventilation and electrical screen. The screen is formed of perforated flexible insulating material and provided with transverse electrical conduits which are connected to a source of electrical power.

The present invention is distinguished over the prior art in general, and these patents in particular by an electrified pet feeding dish for preventing crawling insects from gaining access to the pet's food or water. The dish is formed of electrically insulated material and has at least one pair of parallel electrically conductive strips secured to the side wall of the dish to completely encircle the dish which are connected to a low voltage DC battery also secured to the dish. The strips of electrical conductive material are spaced apart sufficient to normally prevent completion of a circuit across the strips and for completion of a circuit across said strips through an insect's body as the insect attempts to traverse the strips when crawling up the side wall. The current passing through the insects body is sufficient to produce a sensation which will discourage further travel up the side wall. A pet or human who may contact the strips will usually not feel the current, and even if the pet or human is wet, the current will produce only a slight tingling sensation. The electrical apparatus may also be provided in kit form to be installed on conventional dishes by the consumer.

SUMMARY OF THE INVENTION

It is therefore an object of the present invention to provide an electrified pet dish which will effectively deter insects which attempt to crawl into or out of the dish.

It is another object of this invention to provide an electrified pet dish which will deter insects through the use of electricity but is not harmful to humans or pets which may come into contact with the electrical conduits.

Another object of this invention is to provide an electrified pet dish which utilizes electricity efficiently allowing the use of an inexpensive dry cell as the source of electrical power.

Another object of this invention is to provide an electrified pet dish which includes spaced bands of electrodes surrounding the dish and means for creating sufficient voltage across the electrodes only when an insect attempts to cross the electrodes by utilizing the insects body as a conductor.

Another object of this invention is to provide an electrified pet dish which operates continuously for long periods of time without care and maintenance.

A further object of this invention is to provide an electrified pet dish which may be selectively activated to preserve the life of the battery.

A still further object of this invention is to provide an electrified pet dish which is attractive in appearance, simple in design, inexpensive to manufacture, and rugged and durable in use.

Other objects of the invention will become apparent from time to time throughout the specification and claims as hereinafter related.

The above noted objects and other objects of the invention are accomplished by an electrified pet feeding dish for preventing crawling insects from gaining access to the pet's food or water. The dish is formed of electrically insulated material and has at least one pair of electrically conductive strips secured to the side wall of the dish to completely encircle the dish which are connected to a low voltage DC battery also secured to the dish. The strips of electrical conductive material are spaced apart sufficient to normally prevent completion of a circuit across the strips and for completion of a circuit across said strips through an insect's body as the insect attempts to traverse the strips when crawling up the side wall. The current passing through the insects body is sufficient to produce a sensation which will discourage further travel up the side wall. A pet or human who may come into contact with the strips will usually not feel the current, and even if the pet or human is wet, the current will produce only a slight tingling sensation. The electrical apparatus may also be provided in kit form to be installed on conventional dishes by the consumer.

DESCRIPTION OF THE PREFERRED EMBODIMENT

Figure 1:
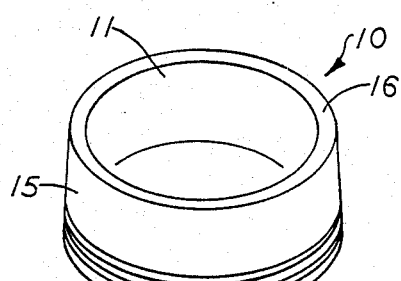
FIG. 1 is an isometric view of a single bowl electrified pet dish in accordance with the present invention.
Figure 2:
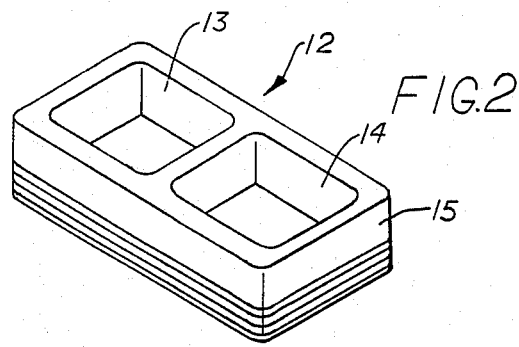
FIG. 2 is an isometric view of a double bowl electrified pet dish in accordance with the present invention.

Referring to the drawings by numerals of reference, there is shown in FIG. 1 an electrified pet dish 10 having a single concave bowl portion 11, and in FIG. 2, an electrified pet dish 12 having double bowls 13 and 14. The pet dishes 10 and 12 represent common container shapes used for holding food and/or water for pets.

The following description will utilize the single bowl dish 10 of FIG. 1 for purposes of illustration. The electrified pet dish 10 is formed of suitable electrical insulating material, such as plastic. The dish 10 has at least one side wall 15 and a concave bowl portion 11 in the top wall 16 to contain food or water for the pet. The concave bowl portion 11 is spaced inwardly of the side wall 15 to define a surrounding cavity 17 therebetween.

Figure 7:
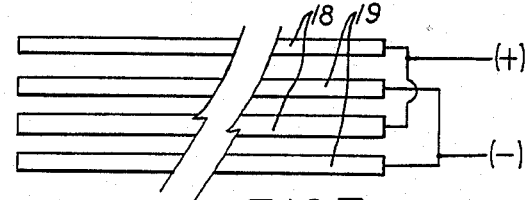
FIG. 7 is a partial elevation of the electrical strips showing the electrical connection.

A series of vertically spaced metallic strips 18 and 19 are secured to the exterior surface of the dish side wall 15 to encircle the dish periphery near the bottom edge. The strips 18 and 19 serve as electrical contacts. In the illustrated example, strip 19 represents the positive contact and strip 19 represents the negative contact. Electrical power is supplied to the strips by a low voltage DC battery 20. It has been found that a small 9 volt battery provides sufficient voltage for the intended purpose. For purposes of illustration, two strips are shown, but it should be understood that multiple strips may also be used, as shown in FIG. 7, wherein the alternating strips would be connected to one terminal of a battery and the interspaced strips connected to the other terminal of the battery.

The metallic strips 18 and 19 are formed of thin flexible electrical conductive material, such as aluminum foil or tin foil. The strips are connected to wires 21 and 22 which extend through small holes 23 provided through the side wall 15. The other ends of the wires are connected to a connector 24 which is releasably attached to the terminals of the battery 20.

Figure 3:
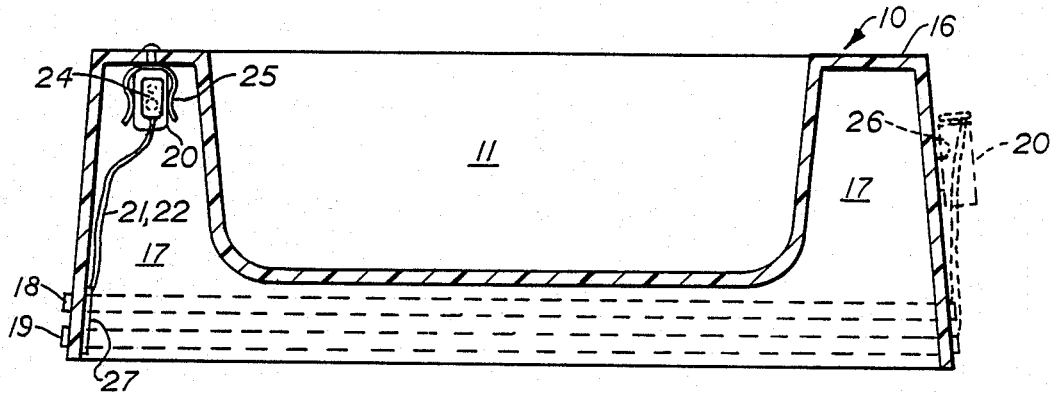
FIG. 3 is a transverse cross section of the electrified pet dish of FIG. 1.
Figure 4:
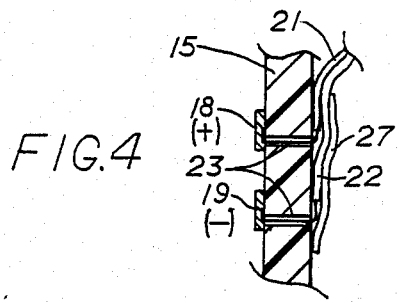
FIG. 4 is an enlarged detail of a portion of the electrified pet dish side wall showing the electrical conductors installed thereon.

A battery clip 25 may be secured on the underside of the dish in a suitable location to releasably secure the battery 20 to the dish. As represented by dotted line in FIG. 3, the battery 20 may also be attached to the underside or the exterior of the dish using a strip of double sided adhesive tape 26. The wires 21 and 22 may be secured to the interior or exterior surface of the side wall 15 by suitable means, such as a strip of tape 27, to prevent them from becoming loosened or pulled from contact with the conductor strips 18 and 19.

Figure 5:
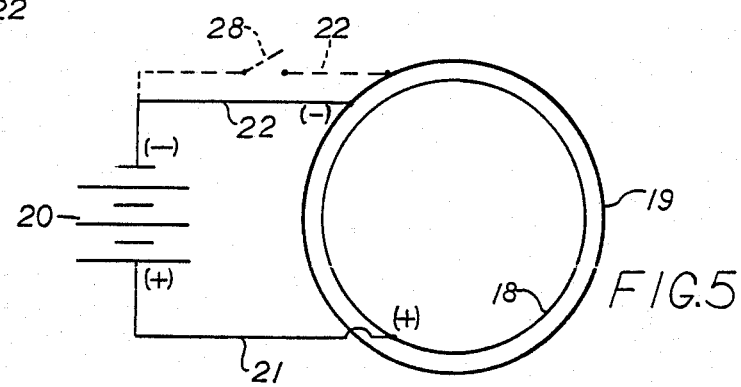
FIG. 5 is a schematic electrical diagram of the electrical circuitry of the electrified pet dish.

The circuitry of the electrical system is shown in FIG. 5, and may include a switch 28 between the battery 20 and one of the conductors 18 or 19. The switch 28 allows the circuitry to be selectively activated when desired to preserve the life of the battery.

Figure 6:
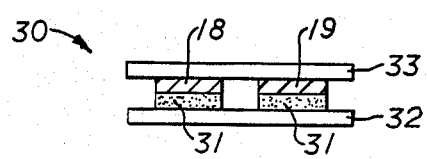
FIG. 6 is a greatly enlarged transverse cross section of the electrical strips in a peel and stick form.

The metallic strips 18 and 19 are secured to the exterior surface of the side wall 15 by suitable means, such as adhesive, glue, or a suitable bonding agent. As shown in FIG. 6, the metallic strips may also be supplied in a peel and stick tape form 30 wherein the metallic strips 18 and 19 are provided with an adhesive backing 31. A strip of waxed paper 32 covers bottom of the tape to protect the adhesive backing 31, and a top strip of paper 33 having a semi-tacky adhesive bottom surface covers the top surface of the metallic strips 18 and 19.

To apply the strips 18 and 19, the assembled tape form 30 is cut to the proper length. The wires 21 and 22 are installed through the holes 23 in the side wall 15 and the unshielded ends are bent over against the side wall. The waxed paper 32 is peeled off to expose the adhesive backing 31 and the metallic strips with the paper 33 still attached are applied to the periphery of the dish completely encircling it, and making firm contact with the exposed ends of the wires 21 and 22. The paper 33 keeps the parallel strips separated at the proper spacing during the application process. The ends of the metallic strips are overlapped on themselves, and the paper 33 is then removed to expose the outer surface of the metallic strips. The connector 24 is then connected to the battery terminals. If the circuitry contains a switch, it is turned on. The electrified dish is then ready for operation. The electrical apparatus may also be provided in kit form to be installed on conventional dishes by the consumer.

Figure 8:
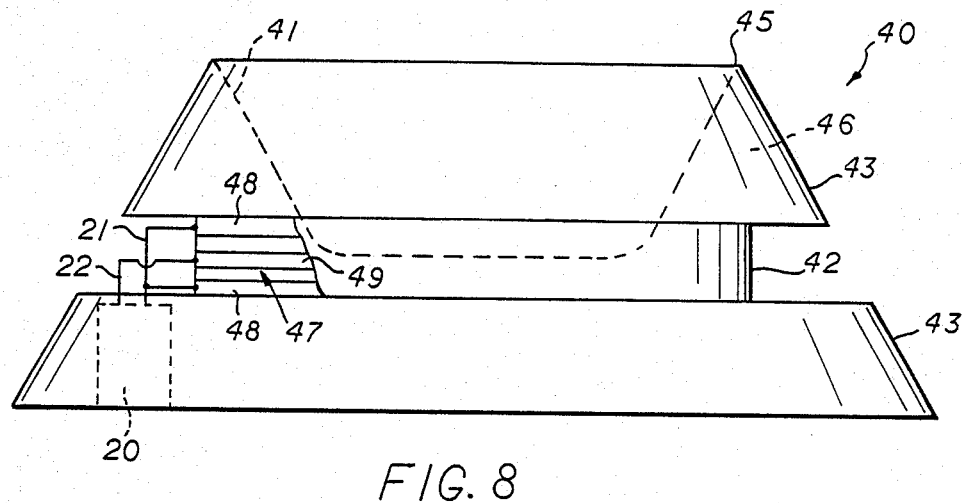
FIG. 8 is a side elevation of a modified pet dish in accordance with the present invention.
Figure 9:
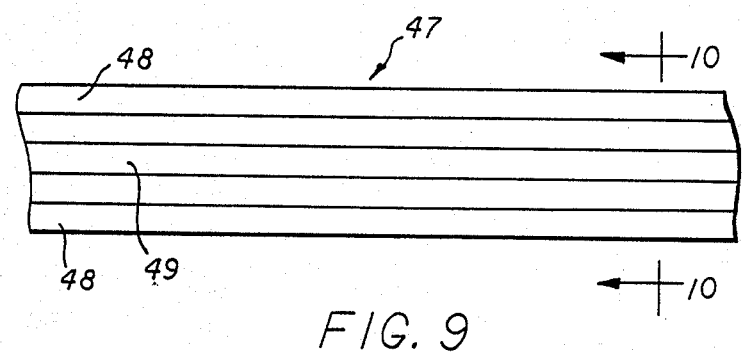
FIG. 9 is a partial elevation of the electrical strips in a peel and stick tape form.
Figure 10:
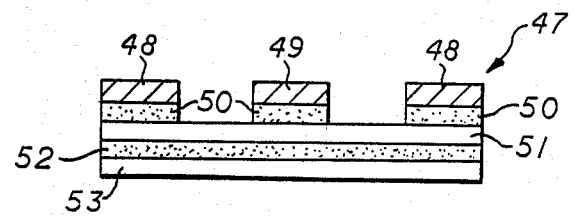
FIG. 10 is a greatly enlarged transverse cross section of the electrical strips in a tape form taken along lines 10—10 of FIG. 9.

Referring to FIG. 8, there is shown a modified pet dish 40 having a single concave bowl portion 41, and a recess 42 in the side wall 43. It should be understood that other shapes having a recess in the side wall may be used without departing from the scope of the invention, such as a rectangular configuration with double bowls.

The following description will utilize the single bowl dish 40, similar to FIG. 1, for purposes of illustration. The electrified pet dish 40 is formed of suitable electrical insulating material, such as plastic. The dish 40 has at least one side wall 43 and a concave bowl portion 41 in the top wall 45 to contain food or water for the pet. The concave bowl portion 41 is spaced inwardly of the side wall 43 to define a surrounding cavity 46 therebetween. A circumferential recess 42 is formed in the side wall 43 to provide a path whereby insects will have to travel as they climb up the side of the bowl.

A strip of tape 47 having a series of vertically spaced metallic strips 48 and 49 are secured to the exterior surface of the dish side wall 43 to encircle the dish periphery within the recess 42. The strips 48 and 49 serve as electrical contacts. In the illustrated example, strips 48 represent the positive contact and the center strip 49 represents the negative contact. Electrical power is supplied to the strips by a low voltage DC battery 20. For purposes of illustration, three strips are shown, but it should be understood that multiple strips may also be used, wherein the alternating strips would be connected to one terminal of a battery and the interspaced strips connected to the other terminal of the battery.

The metallic strips 48 and 49 are formed of thin flexible electrical conductive material, such as aluminum foil or tin foil. As previously described, the strips are connected to wires 21 and 22 which extend through small holes provided through the side wall 43. The other ends of the wires are connected to a connector which is releasably attached to the terminals of the battery 20.

The battery 20 is secured on the underside of the dish in a suitable location by suitable means, such as a clip or double sided adhesive tape, to releasably secure the battery 20 to the dish. The connecting wires may be secured to the interior or exterior surface of the side wall 43 by suitable means, such as tape, to prevent them from becoming loosened or pulled from contact with the conductor strips 48 and 49.

The tape 47 bearing the metallic strips 48 and 49 have an adhesive backing 50 and are secured to a strip of nonconductive support tape 51 in a spaced apart relation. The tape 51 has an adhesive backing 52. A strip of waxed paper 53 covers bottom of the tape 51 to protect the adhesive backing 52.

To apply the tape 47, the assembled tape form is cut to the proper length. The wires 21 and 22 are installed through holes in the side wall 43 and the unshielded ends are bent over against the side wall. The waxed paper 53 is peeled off to expose the adhesive coating 52 and the tape having the metallic strips is applied to the periphery of the recess completely encircling it, and making firm contact with the exposed ends of the wires 21 and 22. The tape 51 keeps the strips separated at the proper spacing during the application process. The ends of the tape is overlapped to expose the outer surface of the metallic strips. The connection is made to the battery 20, and the electrified dish is then ready for operation. The electrical apparatus may also be provided in kit form to be installed on conventional dishes by the consumer.

OPERATION

As insects, such as roaches or ants, climb up the side wall of the dish, they will cross the conductor strips 18 and 19 or 48 and 49. When this occurs, the insect's body completes a circuit across the conductors. The current passing through the insects body is sufficient to produce a sensation which will discourage further travel up the side wall. A pet or human who may come into contact with the strips will usually not feel the current, and even if the pet or human is wet, the current will produce only a slight tingling sensation.

While this invention has been described fully and completely with special emphasis upon a preferred embodiment, it should be understood that within the scope of the appended claims the invention may be practiced otherwise than as specifically described herein.

I claim:

1. An electrified pet feeding dish to prevent crawling insects from gaining access to the pet's food or water comprising;
    a dish formed of electrical-insulating material having at least one side wall portion surrounding a concave bowl portion for containing food or water,
    at least one first strip of electrical-conducting material secured to the side wall of the dish to completely encircle the dish,
    at least one second strip of electrical conducting material secured to the side wall of the dish to completely encircle the dish and spaced parallel to said first strip, and
    a low voltage DC battery secured to the dish,
    said first strip of electrical conducting material being connected to one terminal of said battery and said second strip of electrical conducting material connected to the other terminal of said battery by electrical leads, and
    said first and second strips of electrical conducting material spaced apart sufficient to normally prevent completion of a circuit across said strips and for completion of a circuit across said strips through an insect's body as the insect attempts to traverse the strips.

2. A pet dish according to claim 1 in which
    said dish side wall portion having a surrounding inwardly recessed portion, and
    said first and second strips of electrical conducting material secured to the side wall of the dish within said recess to completely encircle the dish.

3. A pet dish according to claim 1 in which
    said first and second strips of electrically conducting material comprise;
    a first series of vertically spaced apart strips, and
    a second series of vertically spaced apart strips interposed between and parallel to alternating ones of said first series of strips, and
    said first series connected to one terminal of said battery and said second series connected to the other terminal of said battery, and
    adjacent strips spaced apart sufficient to normally prevent completion of a circuit across said strips and for completion of a circuit across said strips through an insect's body as the insect attempts to traverse the strips.

4. A pet dish according to claim 1 in which
    said first and second strips of electrical conducting material are formed of metallic foil.

5. A pet dish according to claim 1 including
    clip means secured on the dish in a suitable location to releasably receive and retain said battery.

6. A pet dish according to claim 1 in which
    said battery is releasably secured to the dish by adhesive material.

7. A pet dish according to claim 1 including
    switch means operatively connected between said first or said second strip of electrical conducting material and one terminal of said battery for selective energization of said strips.

8. A pet dish according to claim 1 in which
    said first and second strips of electrical conducting material are secured to the disk side wall by adhesive material.

9. A pet dish according to claim 1 in which
    said first and second strips of electrical conducting material are provided with an adhesive backing for securing same to the dish side wall.

10. A pet dish according to claim 9 including
    a removable strip of waxed paper covering the adhesive backing, and
    a removable strip of paper having a semi-tacky adhesive bottom surface covering the outer surface of the strips of electrical conducting material, and
    said strips of electrical conducting material installed on said dish by removing said strip of waxed paper to expose the adhesive coating, and with said strip of semi-tacky paper still attached, applying the strips of electrical conducting material to the periphery of the dish side wall to completely encircle it,
    at least two adjacent strips of electrical conducting material making firm contact with opposing electrical leads to the battery, and
    said strip of semi-tacky paper then removed to expose the outer surface of said electrical conducting material.

11. Electrical apparatus adapted for installation on a pet feeding bowl to prevent crawling insects from gaining access to the pet's food or water comprising:
    at least one first strip of electrical conducting material adapted to be removably secured to a side wall of the bowl to completely encircle the bowl,
    at least one second strip of electrical conducting material adapted to be removably secured to the side wall of the bowl to completely encircle the bowl and spaced parallel to said first strip, and
    a low voltage DC battery adapted to be removably secured to the bowl,
    said first strip of electrical conducting material being connected to one terminal of said battery and said second strip of electrical conducting material being connected to the other terminal of said battery by electrical leads, and said first and second strips of electrical conducting material being adapted to be installed on the side wall of the bowl in a spaced apart pattern sufficient to normally prevent completion of a low voltage circuit across said strips and for completion of a low voltage circuit across said strips through an insect's body as the insect attempts to traverse the strips.

12. Apparatus according to claim 11 including a backing strip of non-conductive material adapted to be secured removably on said pet dish, said first and second strips of electrically conducting material comprise;

a first series of vertically spaced apart strips supported on said backing strip, and a second series of vertically spaced apart strips supported on said backing strips interposed between and parallel to alternating ones of said first series of strips, and said first series being connected to one terminal of said battery and said second series being connected to the other terminal of said battery, and said backing strip being adapted to be installed on the side wall of the bowl with said first and second strips in a spaced apart pattern sufficient to normally prevent completion of a low voltage circuit across said strips and for completion of a low voltage circuit across said strips through an insect's body as the insect attempts to traverse the strips.

13. Apparatus according to claim 11 in which said first and second strips of electrical conducting material are formed of metallic foil.

14. Apparatus according to claim 13 in which said backing strip comprises a strip of double sided adhesive material for releasable attachment to the bowl.

15. Apparatus according to claim 14 including a removable strip of waxed paper covering the adhesive side of said backing strip opposite said electrically conductive strips, a removable strip of paper having a semi-tacky adhesive surface covering and releasably adhered to the outer surface of the strips of electrical conducting material, and said strips of electrical conducting material being adapted to be installed on said bowl by removing said strip of waxed paper to expose the adhesive coating, and with said strip of semi-tacky paper still attached, applying the strips of electrical conducting material to the periphery of the bowl side wall to completely encircle it, at least two adjacent strips of electrical conducting material making firm contact with opposing electrical leads to the battery, and said strip of semi-tacky paper then removed to expose the outer surface of said electrical conducting material.

16. The combination with a surface on which food or water is to be stored or used of at least one first strip of electrical-conducting material secured to said surface to completely encircle the same, at least one second strip of electrical conducting material secured to said surface to completely encircle the same and spaced parallel to said first strip, and a low voltage DC battery secured adjacent to said surface, said first strip of electrical conducting material being connected to one terminal of said battery and said second strip of electrical conducting material connected to the other terminal of said battery by electrical leads, and said first and second strips of electrical conducting material spaced apart sufficient to normally prevent completion of a low voltage circuit across said strips and for completion of a low voltage circuit across said strips through an insect's body as the insect attempts to traverse the strips to enter said surface.

17. A combination according to claim 16 in which said first and second strips of electrically conducting material comprise;

a first series of laterally spaced apart strips, and a second series of laterally spaced apart strips interposed between and parallel to alternating ones of said first series of strips, and said first series connected to one terminal of said battery and said second series connected to the other terminal of said battery, and adjacent strips spaced apart sufficient to normally prevent completion of a low voltage circuit across said strips and for completion of a low voltage circuit across said strips through an insect's body as the insect attempts to traverse the strips.

18. A combination according to claim 16 in which said first and second strips of electrical conducting material are formed of metallic foil.

19. A combination according to claim 16 in which said first and second strips of electrical conducting material are secured to said surface by adhesive material.

20. A combination according to claim 16 including a two-sided adhesive backing strip of non-conductive material secured removably on said surface, and said first and second strips of electrical conducting material are adhesively secured on said backing strip.

* * * * *